United States Patent [19]

Catto et al.

[11] 3,833,186

[45] Sept. 3, 1974

[54] TELEPHONE ANSWERING DEVICE

[75] Inventors: Kenneth A. Catto; Harold R. Burt, both of Beaverton, Oreg.

[73] Assignee: Data Time, Inc., Portland, Oreg.

[22] Filed: Nov. 24, 1972

[21] Appl. No.: 308,970

[52] U.S. Cl. ........... 242/201, 179/100.2 R, 274/4 D

[51] Int. Cl. ........................ B11b 15/32, G03b 1/04

[58] Field of Search ............................ 242/201–204, 242/206–210; 274/4 D, 11 D; 179/100.2 R

[56] References Cited

UNITED STATES PATENTS

| | | | |
|---|---|---|---|
| 3,133,711 | 5/1964 | Jager | 242/210 |
| 3,288,386 | 11/1966 | Gerfast et al. | 242/204 |

*Primary Examiner*—Leonard D. Christian
*Attorney, Agent, or Firm*—Kolisch, Hartwell, Dickinson & Stuart

[57] ABSTRACT

A direct coupled telephone answering device having an announcement deck for recording and reproducing an announcement in response to an incoming call and a message deck for recording and reproducing incoming messages. Forward and reverse tape motion for both decks is provided by a single flywheel and a simple system of drive belts. All rotating reels are mounted for free rotation on fixed spindles. Hubs in these wheels, which preferably are formed of plastic, comprise bearings which ride on such spindles, promoting uniform bearing wear even with substantial side-loading on the wheels. A single syllabic detector coupled to an announcement time-out circuit and a message time-out circuit provides control signals for various switching functions at predetermined time periods after termination of the announcement and message, thus affording a broad variable timing cycle for both the announcement deck and the message deck. Circuitry is provided for individually varying the durations of the time periods.

4 Claims, 22 Drawing Figures

PATENTED SEP 3 1974

3,833,186

PATENTED SEP 3 1974

3,833,186

TELEPHONE ANSWERING DEVICE

BACKGROUND OF THE INVENTION

1. Field of the Invention

This invention relates to telephone answering devices of the type utilized to reproduce a recorded announcement in response to an incoming call and for recording incoming messages after the announcement has ended. More particularly, this invention relates to such devices which are directly coupled to the telephone line, as opposed to those which are acoustically coupled to a telephone handset.

2. Brief Description of the Prior Art

Several types of telephone answering devices are known which provide a machine-based telephone answering service for the owner. Such devices fall into one of two residual categories: acoustically coupled devices, and direct coupled devices.

Acoustically coupled devices ordinarily provide electromechanical circuitry for mechanically lifting the owner's telephone handset in response to an incoming call, audibly reproducing an announcement previously recorded by the owner, acoustically coupling the reproduced announcement to the handset receiver where it is transmitted to the caller in the manner of ordinary speech, and replacing the handset on the telephone cradle. More sophisticated devices provide additional electromechanical circuitry for recording messages received from the caller before replacing the handset, the message being acoustically coupled to a separate recording apparatus housed in the device. Such devices are also typically provided with a message monitoring feature for enabling the owner to review all such messages received and recorded.

Direct coupled devices customarily include circuitry for performing these same functions, but differ from acoustically coupled devices in that the announcement and the incoming message are directly coupled to and from the telephone line, respectively, without an intermediate audible reproduction and coupling.

Both such types have heretofore suffered from several disadvantages. The former type requires cumbersome and error-prone lifting or support mechanisms for the handset which are expensive to manufacture and difficult to repair. Further, acoustically coupled devices frequently suffer from lack of audio fidelity in both reproduction of the announcement and recording of the incoming message. In addition, such devices are often complicated to operate and unsightly in appearance, thus rendering them undesirable from a user's standpoint.

Known direct coupled devices require complicated switching circuits employing a large number of mechanical switching components which makes such devices expensive to manufacture and prone to mechanical failure. Also, many such devices require special couplers which are complicated to install and which are not fully compatible with existing telephone lines, thus requiring adaptation and prior approval from the owner of the telephone lines before they may be installed.

Both types of device typically employ separate announcement and message decks, each deck having a number of expensive bearing-mounted rotatable reels and pulleys and other numerous precision made mechanical parts.

In addition, both types typically provide an announcement deck with a mandatory fixed announcement cycle which must be completed before the machine is switched over to a message record mode of operation. Such a cycle is inefficient in that the length of the announcement is typically much less than the duration of the announcement cycle provided, thus obliging the caller to wait an inordinate length of time before beginning his message. Attempts to design circuits for overcoming this problem have been found to increase the cost of the device inordinately while decreasing reliability and have generally not produced effective results.

Both types also ordinarily provide a mandatory fixed message cycle for each message recorded, within which time the caller must complete his message or be automatically disconnected, thus inconveniencing the caller and severely limiting the efficacy of the instrument.

SUMMARY OF THE INVENTION

The invention disclosed herein comprises a direct coupled telephone answering device having an announcement deck and a message deck for performing the functions delineated above in an optimum fashion. Forward and reverse tape directions for both decks are provided by a relatively simple mechanism which includes a single flywheel. All rotatable reels and pulleys are constructed from inexpensive molded plastic parts, which include central hub bearings that are rotatably disposed about fixed spindles thereby eliminating the need for expensive bearing parts while maintaining excellent wear properties.

The invention includes a single syllabic detector which provides a variable announcement cycle and a variable message cycle. The detector automatically enables the device to be switched over to the message record mode of operation a first predetermined time period after the announcement has ended, regardless of the length of the announcement, thus eliminating the need for tailoring the length of the announcement to a fixed time period. The detector also enables the device to be disconnected from the telephone line a second predetermined time period after the caller has ended the message, thus eliminating the need for tailoring the length of the message to a fixed time period. Circuitry is provided for individually varying the length of both the first and second time periods by means of a simple adjustment to the device which can be accomplished by relatively unsophisticated users.

The present invention is fully compatible not only with commercially available standard couplers, but also with telephone lines, per se, and thus does not require adaptation before being connected for use.

In addition to providing telephone answering and message recording capability, the message deck of the invention may also be used as an office dictating machine.

Further, the invention is extremely inexpensive to manufacture, highly reliable in performance, and may be embodied in an aesthetically pleasing package.

For a fuller understanding of the nature and advantages of the invention, reference should be had to the following detailed description, taken in conjunction with the accompanying drawings.

DESCRIPTION OF THE PREFERRED EMBODIMENT

Figure 1:
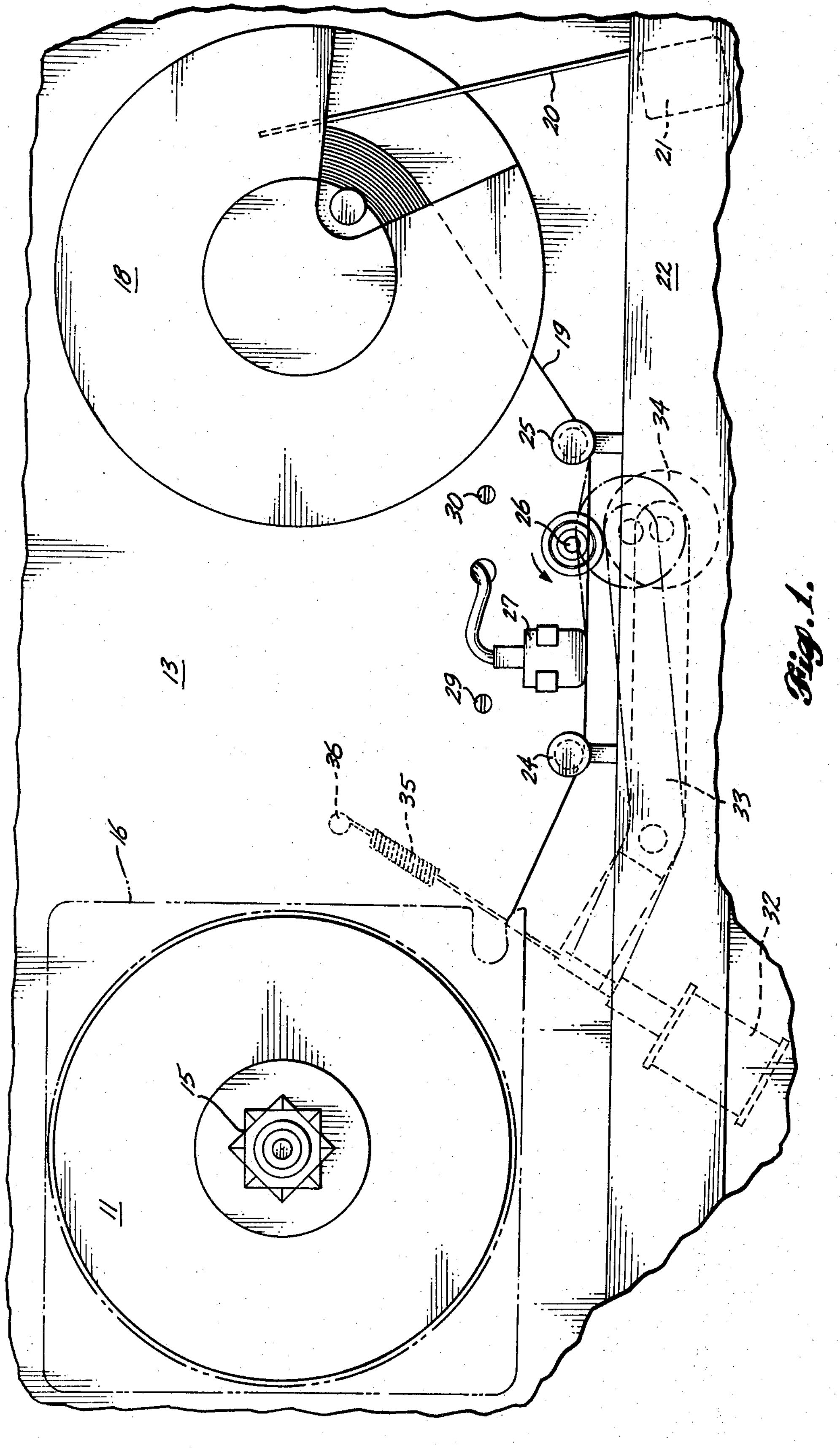
FIG. 1 is a simplified top plan view of a telephone answering device embodying the invention and showing a portion of the message deck.

Turning now to the drawings, FIG. 1 is a plan view of a preferred embodiment of the invention showing a portion of the message deck used for recording and reproducing incoming messages and for recording and reproducing dictation type messages. In FIG. 1, the front of the device is located at the bottom of the figure. A circular supply reel driving disc 11 is rotatably mounted above a top mounting plate 13, only a portion of which is shown for clarity. Driving disc 11 has an upwardly extending hub 15 in the shape of a star wheel suitable for driving engagement with a supply tape cartridge indicated by phantom outlines 16, of the type disclosed in my issued U.S. Pat. No. 3,768,753 for "Tape Cartridge". It is understood that the shape of hub 15 may be changed to accommodate other tape cartridges having different designs.

A take-up reel 18 is rotatably mounted to the right of supply reel disc 11 and is shown with a quantity of magnetic recording tape 19 wound about the hub. Resting on the outermost layer of the recording tape is an actuator arm 20 of a single pole, single throw message deck rewind limit switch 21, which is mounted below a raised portion 22 of top mounting plate 13.

Mounted on top mounting plate 13 near the edge of raised portion 22 are a pair of slotted tape guides 24, 25, a bearing-mounted capstan 26, a message record/erase head 27, and a pair of slotted posts 29, 30 suitable for anchoring a protective cover, (omitted for clarity). Guides 24, 25, capstan 26, and head 27 comprise a portion of the message deck tape drive assembly, the remainder of which comprises a forward message solenoid, hereinafter designated FWD M, 32, a pivot arm 33, a pinch roller 34 rotatably mounted on pivot arm 33 and a bias spring 35 attached at one end to the junction of arm 33 and the working end of solenoid 32 and at the other end to a fixed post 36. As indicated by the hidden lines, these elements are all mounted on the underside of top mounting plate 13. The vertical wall between top mounting plate 13 and raised portion 22 has an opening sufficient to provide working space for pinch roller 34 and a portion of arm 33.

As will now be evident, actuation of FWD M solenoid 32 pulls the left end of arm 33 causing pinch roller 34 to press recording tape 19 against the surface of capstan 26. As will be seen from the description below, when the central flywheel of the device is rotating, capstan 26 rotates counterclockwise as shown in FIG. 1. Thus, when the tape is engaged with the capstan it is pulled from tape supply cartridge 16 to the right in the forward direction. As described more fully below, whenever tape is pulled from cartridge 16 in this manner, take-up reel 18 is also rotated counterclockwise, causing tape 19 to be wound about the hub of this reel.

Figure 2:
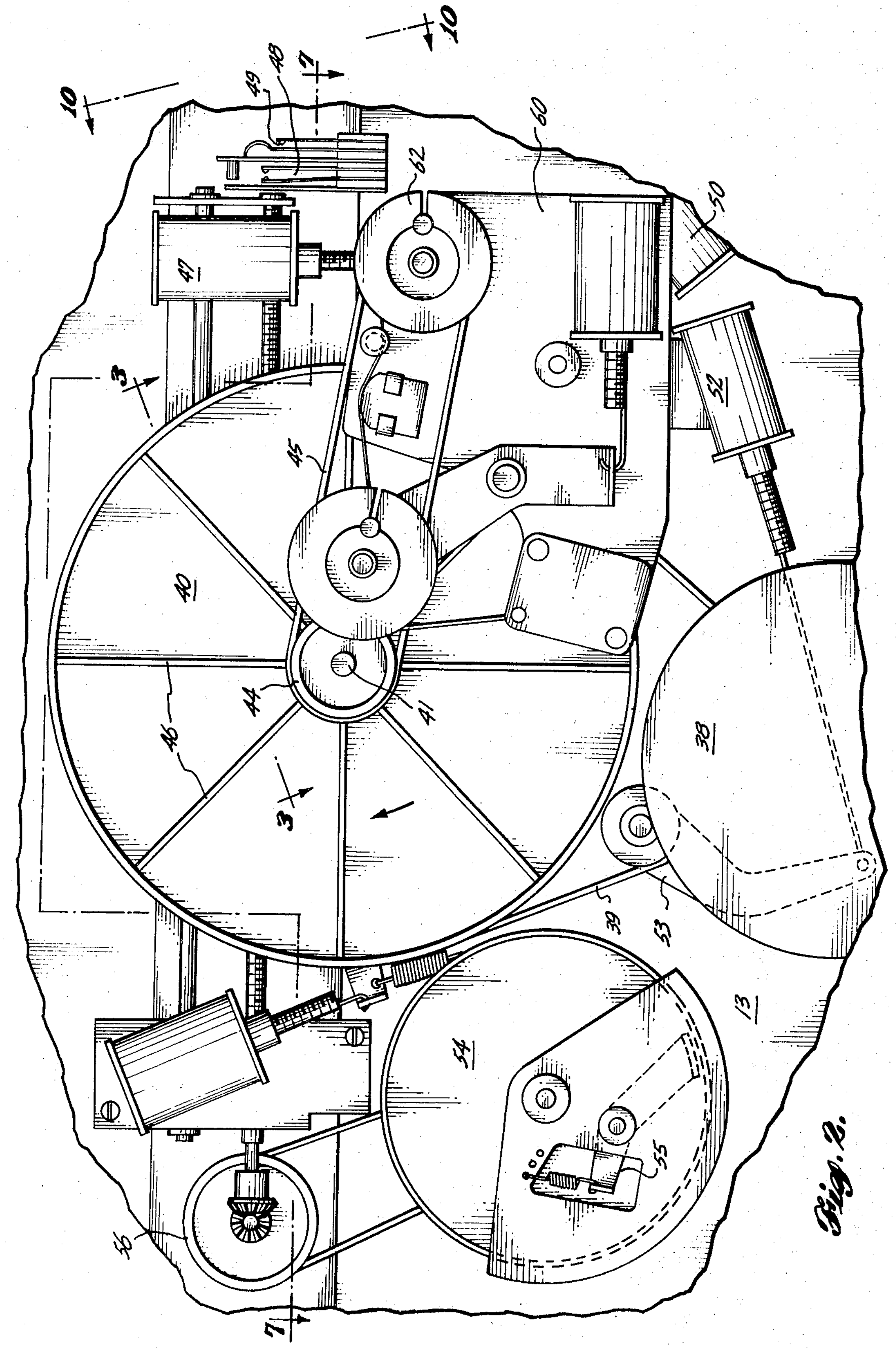
FIG. 2 is a simplified bottom plan view of the portion of the telephone answering device of FIG. 1.

FIG. 2 is a bottom plan view of the preferred embodiment, the front of the device being located at the top of the figure. As with FIG. 1, only that portion of top mounting plate 13 necessary to an understanding of the invention is shown. As seen in FIG. 2, a motor 38 is mounted by suitable means (not shown) to mounting plate 13 and operatively coupled by a first O-ring drive belt 39 to a center flywheel 40, the outer periphery of which is grooved to receive O-ring 39.

Central flywheel 40, which is rotatably mounted in top mounting plate 13 for rotation in the direction indicated by the arrow, is provided with a central spindle 41, the upper portion of which has a reduced diameter and comprises capstan 26 (shown in FIG. 1). Considering FIGS. 6 and 7 along with FIG. 2, the upper portion of central flywheel 40 is provided with an upper hub portion 42 having a peripheral groove adapted to receive a second O-ring drive belt 43 for driving message deck take-up reel 18 in the forward tape direction. Central flywheel 40 also has a lower hub 44 having a peripheral groove adapted to receive a third O-ring drive belt 45 for driving an announcement deck supply reel 62 in the reverse tape direction. A number of radial ribs 46 add structural strength to flywheel 40.

Mounted to the right of central flywheel 40 is SCAN solenoid 47 for a purpose described below. Mounted above and to the right of SCAN solenoid 47 is a stacked pair of leaf switches comprising a transfer 48 and a message deck forward limit switch 49, also for a purpose described below.

Also visible in FIG. 2 are portions of a BRAKE solenoid 50, a REWIND solenoid 52, a message deck rewind assembly 53, a rotatably mounted motion damping member 54, a tension assembly 55, a length of message indicator assembly 56, and an announcement deck assembly 60.

Figures 3, 4:
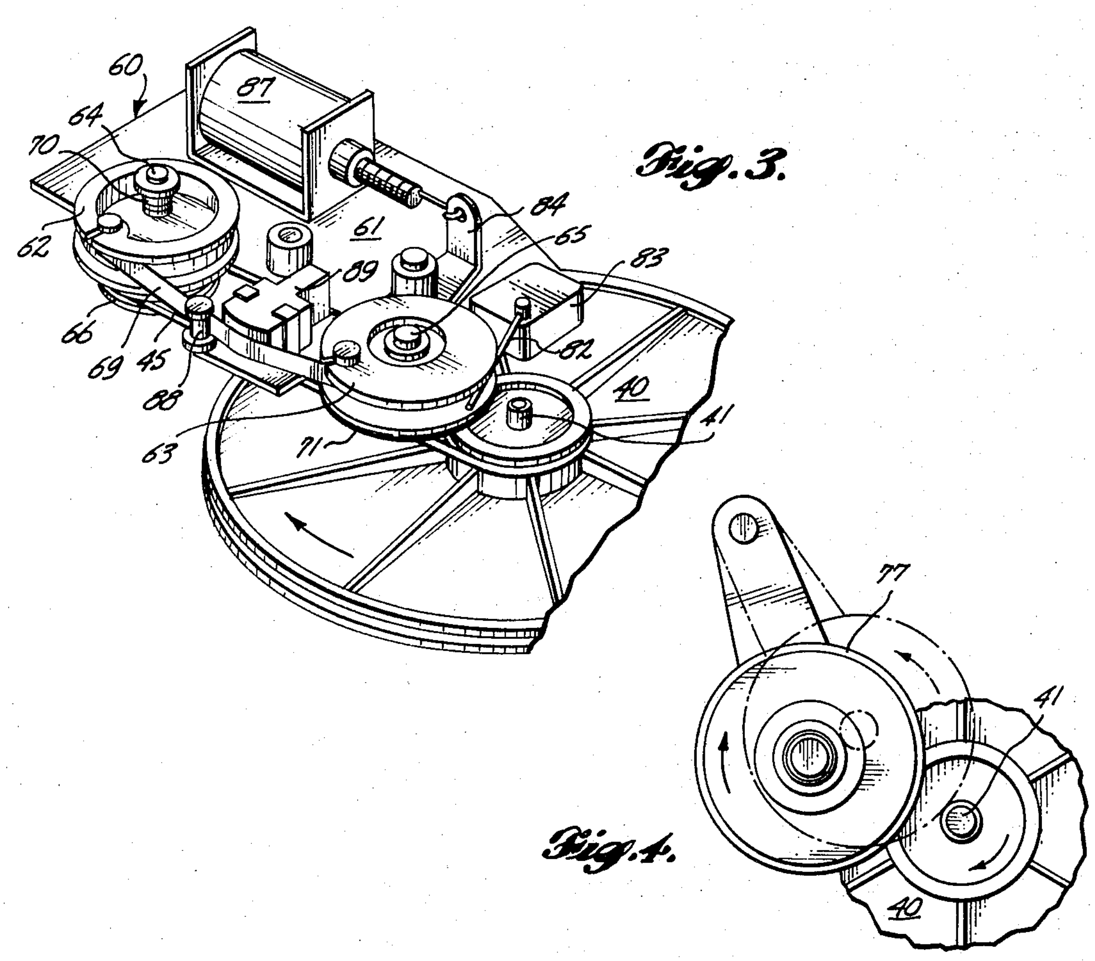
FIG. 3 is a perspective view of the announcement deck taken generally along line 3—3 of FIG. 2.
FIG. 4 is a detail view illustrating the operation of the forward drive mechanism for the announcement deck.
Figure 5:
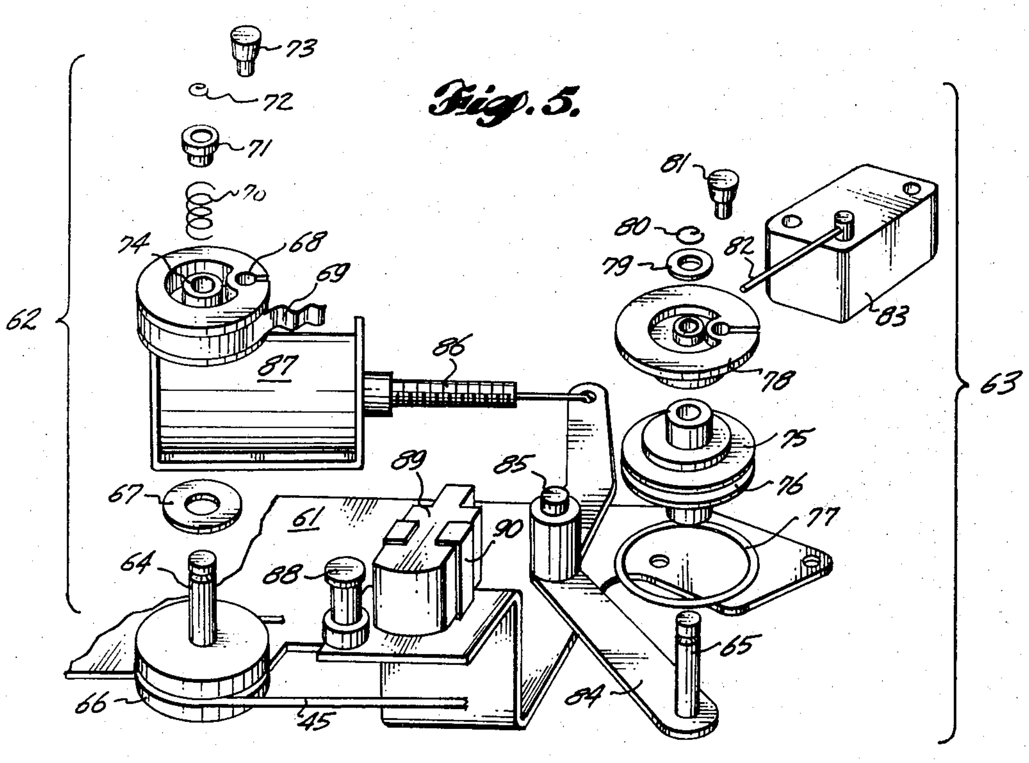
FIG. 5 is an exploded perspective view of the announcement deck.

Referring now to FIGS. 3-5, announcement deck assembly 60 includes a mounting plate 61 mounted to the underside of top mounting plate 13. A supply reel 62 and a take-up reel 63 are rotatably mounted on spindles 64, 65 which are fixed to mounting plate 61 by any suitable means.

As shown most clearly in FIG. 5, supply reel 62 comprises a lower cylindrical member 66 having a peripheral groove for receiving O-ring 45, a friction washer 67, an upper spool member 68 adapted to contain a quantity of recording tape 69, a compression spring 70, a collard keeper 71, a split keeper 72, and a tape fastener peg 73. The top portion of upper spool member 68 is provided with an annular recess having a central upstanding cylindrical portion 74 with an outer diameter adapted to receive compression spring 70. When assembled, compression spring 70 provides an axial thrust for squeezing members 66, 67, and 68 together, thereby providing a friction coupling therebetween.

Take-up reel 63 comprises a lower reel member 75 having a peripheral rim groove 76 adapted to retain a snugly fitting O-ring 77 therein, an upper reel member 78, a washer 79, a split keeper 80, and a tape fastening peg 81. When assembled, a hub clearance slot is provided between lower member 75 and upper reel member 78 which is sufficiently wide to receive an actuator arm 82 of a double pole single throw rewind limit switch 83. As noted, both supply reel 62 and take-up reel 63 are mounted for free rotation about their respective spindles 64, 65 without the use of any expensive bearing parts.

Take-up reel spindle 65 is fixed to a first end of an arm 84 which is pivotally mounted on a post 85 which in turn is fixed to mounting plate 61. The other end of arm 84 is connected to the working end 86 of an announcement forward solenoid, hereinafter designated FWD A solenoid, 87. FWD A solenoid 84 is secured to mounting plate 61 by a suitable mounting bracket.

A tape guidepost 88 is secured to mounting plate 61 adjacent an announcement record/erase head 89 having a mounting clip 90 also attached to mounting plate 61.

A mechanical operation of the announcement deck will now be described. As best seen in FIGS. 3 and 4, with central flywheel 40 rotating clockwise as shown, and FWD A solenoid 87 deenergized, the motion of flywheel 40 is transmitted by O-ring drive belt 45 to lower cylindrical member 66 of supply reel 62. This motion is coupled via friction washer 67 under the control of compression spring 70 to upper spool member 68, thus providing a constant motion in the reverse or rewind tape direction. So long as FWD A solenoid 87 remains deactuated, announcement tape 69 is rewound until taut, at which time compression spring 70 and friction washer 67 permit slippage to occur between lower cylindrical member 66 and upper spool member 68. In this condition, actuator arm 82 of annoucement rewind limit switch 83 is positioned in the take-up reel hub slot.

When FWD A solenoid 87 is energized by an appropriate signal, pivotable arm 84 forces friction rim drive O-ring 77 into engagement with the protruding portion of rotating central flywheel spindle 41 (see FIG. 4). The friction coupling provided by compression spring 70 and friction washer 67 is selected to be less than the forward pull provided by the friction rim drive so that engagement of friction rim drive O-ring 77 with flywheel spindle 41 causes take-up reel 63 to be driven in the forward tape direction. Shortly thereafter, a portion of the take-up reel hub having tape wound thereon forces actuator arm 82 out of the hub slot, thereby throwing announcement rewind limit switch 83 to the opposite switch configuration. The forces due to the forward pull provided by take-up reel 63, and tape guide 88, in conjunction with the reversed tape tension caused by the continual reverse rotation of lower cylindrical member 66 and friction washer 67, provide sufficient tension on the back of announcement tape 69 to engage the magnetic surface of the tape with the curved face of annouce head 89. Forward movement of announcement tape 69 continues in this manner until FWD A solenoid 87 is deenergized, whereupon the reverse motion provided by O-ring drive belt 45 again fully rewinds announcement tape 69.

Although a reverse bias spring could be provided for arm 84, in practice it has been found that the reverse pull of tape 69 on take-up reel 63 is sufficient to retract friction rim drive O-ring 77 from the surface of spindle 41.

As will now be evident, the announcement deck mechanism utilizes unidirectional motion from central flywheel 40 to drive the announcement tape in both the forward and reverse directions without the use of reversing gears, etc.

Figure 6:
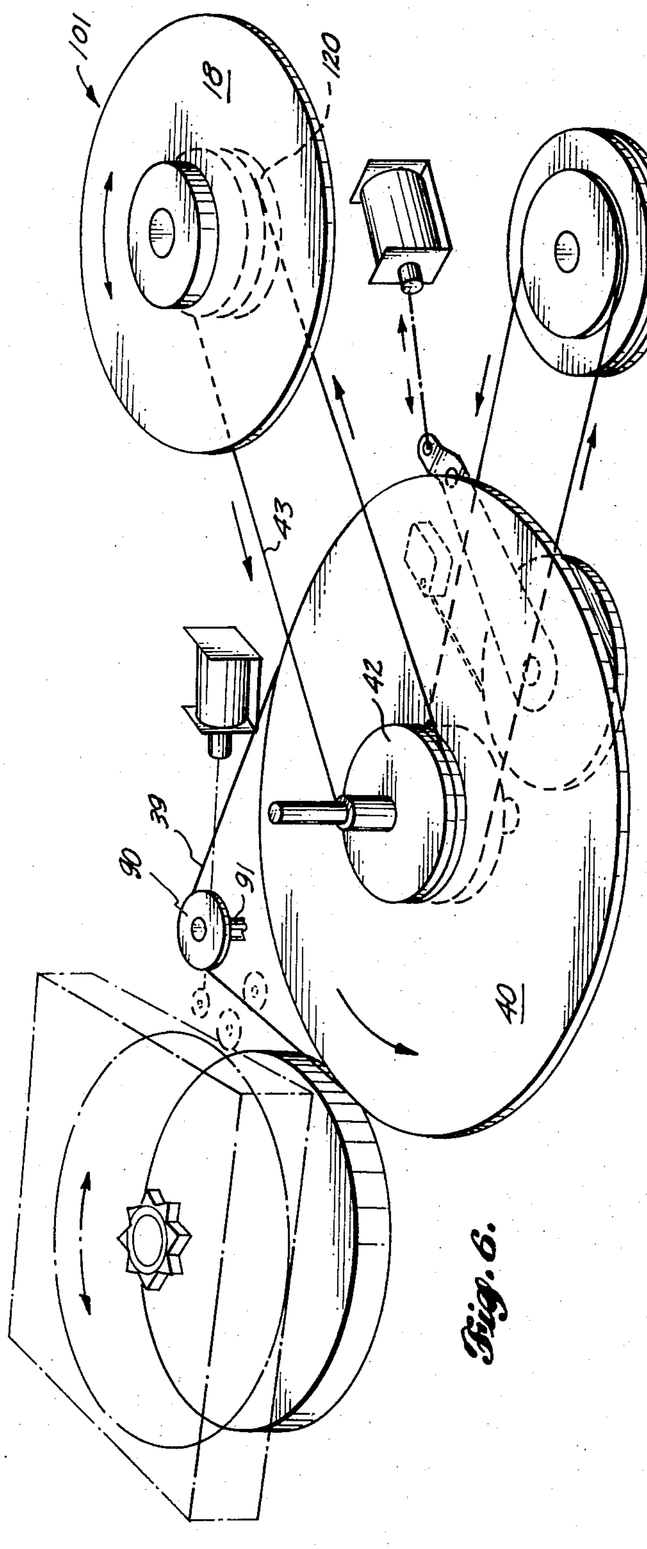
FIG. 6 is a schematic perspective view showing the cooperative relation between the various driven members.
Figure 8:
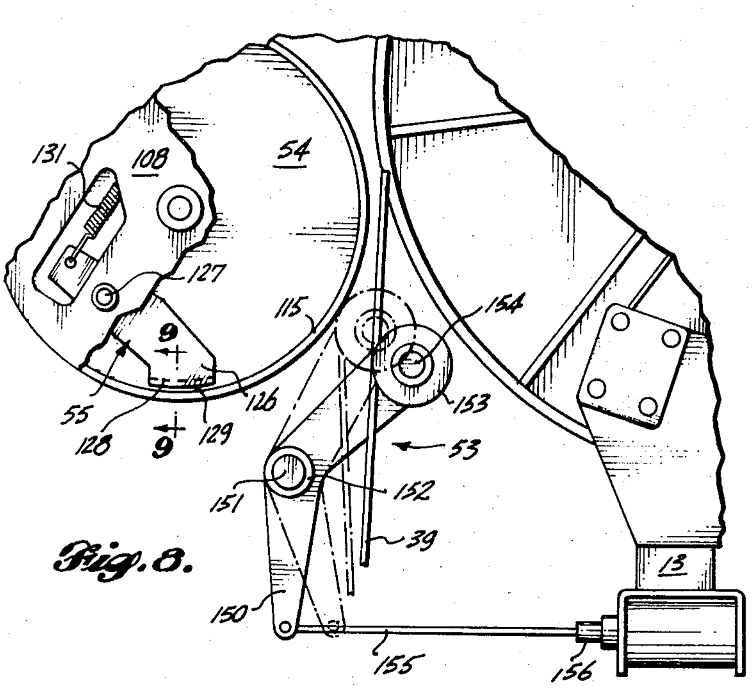
FIG. 8 is a detail plan view showing the operation of the reverse mechanism for the message deck.

The mechanical structure and operation of the message deck assembly will now be described and may best be understood by first referring to FIG. 6, which schematically depicts the interrelation between the various driven members of the preferred embodiment. O-ring drive belt 39 is reeved about the outer peripheral grooved circumference of central flywheel 40 and a pulley 90 mounted on a shaft 91 of motor 38. O-ring drive belt 43 is reeved about upper grooved portion 42 of central flywheel 40 and a lower grooved cylindrical member 120 of take-up reel assembly 101. As described below in more detail, take-up supply reel assembly 101 is provided with a friction clutch similar to that already described in conjunction with the announcement deck supply reel structure. Message deck rewind assembly 53, described in detail below with relation to FIG. 8, is adapted to engage O-ring drive belt 39 with a flanged surface of motion damping member 54. As already seen, capstan portion 26 of central flywheel spindle 41 is engageable with pinch roller 34 (FIG. 1), while O-ring drive belt 45 is reeved about lower hub 44 and lower cylindrical member 66 of announcement supply reel 62, and friction rim drive O-ring 77 is engageable with the lower surface portion of spindle 41.

Thus, with central flywheel 40 rotating in the direction indicated by the arrow, lower cylindrical member 120 of message deck take-up reel assembly 101 is continuously rotated in the forward tape direction while lower cylindrical member 66 of announcement supply reel 62 is continuously rotated in the reverse tape direction. To rewind the message tape, rewind assembly 53 is actuated to engage O-ring 39 with the surface of motion damping member 54. In a similar manner to that described above in conjunction with the announcement supply reel friction clutch, the strength of the frictional coupling provided by the message take-up reel friction clutch is selected to be less than the reverse pull on the message tape provided by rewind assembly 53. Thus, when rewind assembly 53 is actuated, the message tape is rewound against the forward pull exerted on the message take-up reel assembly 101. For the sake of completeness, it is again noted that the announcement tape is pulled forward against the reverse pull exerted on the announcement tape by announcement supply reel 62 by the engagement of friction rim drive O-ring 77 with central flywheel spindle 41.

Figure 7:
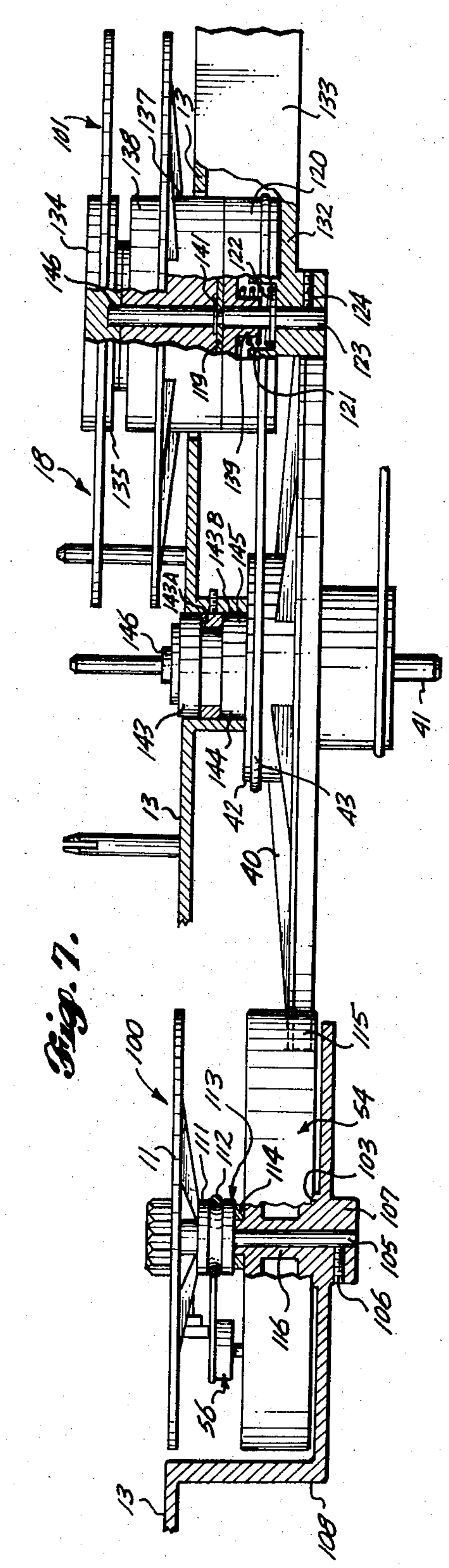
FIG. 7 is a partially broken away detail view along line 7—7 of FIG. 2.

Turning now to FIG. 7, the message supply and time-out reel assemblies 100, 101 are shown in detail. Message supply reel assembly 100 comprises supply reel driving disc 11, motion damping member 54, a spacer washer 103, spindle 105, and a set screw 106 for anchoring spindle 105 in a cylindrical aperture 107 in well portion 108 of top mounting plate 13. As shown in FIG. 1, driving disc 11 is rotatably fastened at the upper end of spindle 105 by means of a split keeper 110. The underside of driving disc 11 is provided with a plurality of tapered ribs to provide additional structural strength. Depending from the underside of driving disc 11 is an integral cylindrical member 111 having an O-ring 112 reeved thereabout for driving length of message indicator assembly 56, described below in conjunction with FIGS. 12 and 13. The bottom side of cylindrical member 111 has a pair of depending teeth 113, only one of which is illustrated, mated with a corresponding slot in an upper hub portion 114 of motion damping member 54. Motion damping member 54 is formed in the shape of a generally cylindrical cup having a peripheral flanged portion 115 and a central annular cylindrical portion 116.

To assemble, driving disc 11 is passed over the top of spindle 105 and split keeper 110 is fastened to the top of spindle 105. Spindle 105 is next inserted through the central aperture in motion damping member 54 and spacer washer 103, and motion damping member 54 is rotated relative to driving disc 111 until teeth 113 mate with their corresponding slot. Spindle 105 is then inserted through aperture 107 and secured against rotation by tightening set screw 106. As will be evident to those skilled in the art, spacer washer 103 provides a clearance between the bottom edge of peripheral flange 115 and the upper surface of well portion 108.

Figure 9:
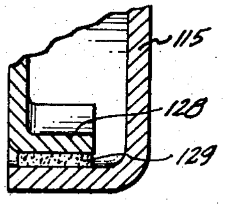
FIG. 9 is an enlarged sectional view taken along line 9—9 of FIG. 8.

An important feature of the supply reel driving assembly 100 contributing to the proper operation of the message deck is tape tensioning assembly 55 shown in FIGS. 2, 8, and 9. Tape tension assembly 55 comprises an arm 126 pivotally mounted on a post 127 secured in an aperture in well portion 108. At one end thereof, arm 126 is provided with an upwardly extending flange portion 128 having friction path 129 constructed of a suitable material, such as cork or felt, secured thereto. The other end of arm 126 is provided with a downwardly extending flange portion 130 to which one end of an extension spring 131 is attached. The other end of extension spring 131 is secured to well portion 108 as shown, in an extended configuration in order to provide mechanical bias for holding friction pad 129 against the inner surface of peripheral flange 115. This simple arrangement has been found to provide sufficient tensioning force resisting the pull of the message tape in the forward direction to ensure that the tape is held against the surface of the message head 27. The amount of spring tension required to provide optimum results may be empirically determined.

Returning now to FIG. 7, message take-up reel assembly 101 comprises take-up reel 18, a friction washer 119, lower cylindrical member 120, a compression spring 121, a collared keeper 122, a spindle 123, and a set screw 124 for anchoring spindle 123 in a cylindrical aperture 132 in well portion 133 of top mounting plate 13.

Take-up reel 18 comprises an upper disc portion 134 having a central reset for accommodating the top of spindle 123 and an inner hub portion 135, and a lower disc portion 137 having an inner hub portion 138, a central aperture for receiving spindle 123, and a bottom surface having a recess for accommodating a portion of friction washer 119. Lower cylindrical member 120 has a central annular recess with a downwardly extending, aperture cylindrical portion 139, the outer diameter of which is dimensioned to accommodate compression spring 121.

To assemble, take-up reel 18 is first assembled by inserting an upper split keeper 140 into a slot at the upper end of spindle 123, passing spindle 123 down through the central aperture in lower disc portion 137 and inserting a lower split keeper 141 into a second slot in the middle portion of spindle 123. Upper disc portion 134 is next fastened to the top of lower disc portion 137, e.g., by cementing. It is noted that inner hub portions 135 and 138 when mated provide a slot for accommodating actuation arm 20 of message rewind limit switch 21 (FIG. 1). The operation of this switch is similar to that already described in relation to announcement rewind limit switch 83. Thus, with tape on the takeup reel hub, actuator arm 20 maintains the switch contacts in a closed position; with no tape on the hub, the switch contacts are open.

With reel 18 assembled and rotatably secured, spindle 123 is next passed through the central aperture in lower cylindrical member 120, after which compression spring 121 and collared keeper 122 are passed over the bottom thereof. Spindle 123 is then inserted into aperture 132 and secured against rotation by tightening set screw 124. The correct vertical position of spindle 123 required to provide the proper frictional coupling between lower cylindrical member 120 and take-up reel 18 may then be determined empirically. As will be evident, the operation of the friction coupling mechanism of take-up reel assembly 101 is substantially identical with that already described in conjunction with announcement supply reel 62.

From the above description, it is now apparent that both supply reel assembly 100 and take-up reel assembly 101 are freely rotatably mounted about fixed spindles 105, 123 without the use of any expensive bearing parts.

FIG. 7 also illustrates the means used to mount central flywheel 40 in the preferred embodiment. A pair of axially spaced bearings 143 having outer races 144 and inner races 145 are slidably fitted into a hollow cylindrical recess formed integrally with top mounting plate 13. The upper portion of central flywheel spindle 41 is press fitted into inner races 145. Bearings 143 are held apart by a cylindrical sleeve **143*a* and a spring washer 143*b* which surround spindle 41 and seat against outer races 144. Keepers 146** retain the bearings on the spindle.

FIG. 8 illustrates in detail message deck rewind assembly 53, the general operation of which has been described above in conjunction with FIG. 6. An arm 150 is pivotally mounted on a fixed post 151 by means of a split keeper 152. On one end of arm 150, a grooved pulley 153, adapted to accommodate O-ring drive belt 39, is rotatably mounted on a post 154. The other end of arm 150 is secured via link 155 to the working end of a rewind solenoid, hereinafter designated REW, 156 which is secured to the underside of top mounting plate 13 in any suitable manner. When REW solenoid 156 is pulled by an appropriate signal, arm 150 pivots in a counterclockwise direction as viewed in the figure, and pulley 153 forces moving O-ring drive belt 39 into surface contact with peripheral flange portion 115 of motion damping member 54. As noted above in conjunction with the description of FIG. 6, the resulting rotation of supply reel assembly 101 is in the tape rewind direction. A suitable return spring is used for this purpose.

Figure 10:
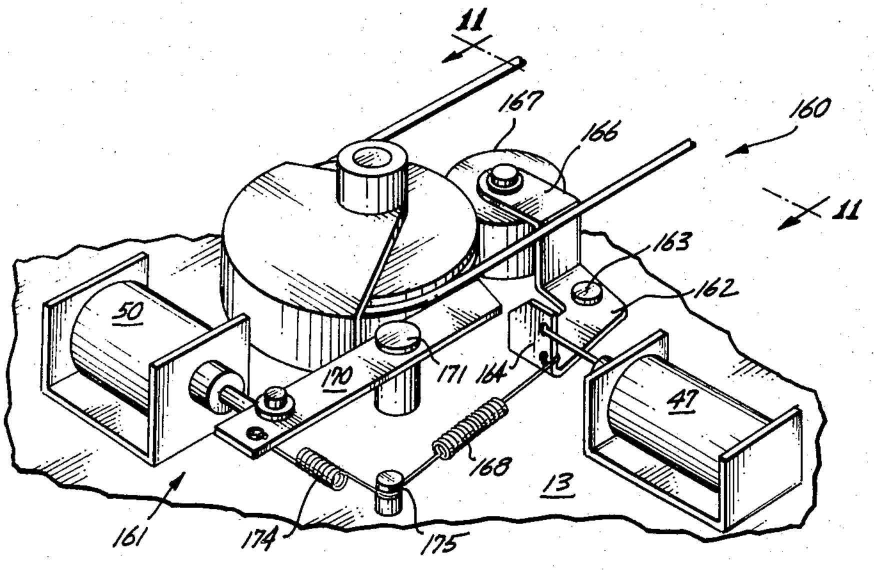
FIG. 10 is an enlarged detail perspective view illustrating the scan mechanism for the message deck.
Figure 11:
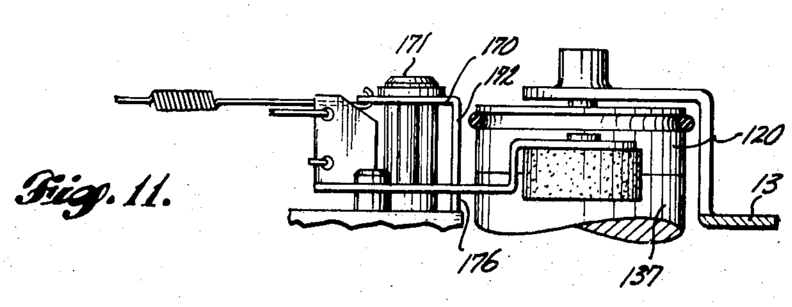
FIG. 11 is a detailed end view taken along line 11—11 of FIG. 10.

FIGS. 10 and 11 illustrate in detail a fast forward or scan mechanism 160 utilized to rapidly advance the message tape in the forward tape direction, as well as a braking device 161 used on the take-up reel assembly 101, both of which are largely hidden from view in FIG. 2 by the announcement deck assembly. Scan mechanism 160 comprises scan solenoid 47, a bracket 162 pivotally mounted on a post 163 and having a first angled portion 164 connected to the working end of scan solenoid 47. A second angled portion 166 having a pressure roller 167 constructed from a suitable friction material, e.g., rubber, rotatably suspended therefrom. Pressure roller 167 has a width sufficient to bridge the outer surfaces of lower disc portion 137 and lower cylindrical member 120 of take-up reel assembly 101. A return bias spring 168 is coupled between angle portion 164 and a fixed post 175.

Braking device 161 comprises brake solenoid 50, and arm 170 pivotally mounted on a post 171 and having a first end width an angled portion 172 and a second end coupled to the working end of brake solenoid 50 and a return bias spring 174, the other end of which is connected to fixed post 175. A friction pad 176 of suitable friction material, e.g., felt or cork, is secured to angled portion 172 adjacent the outer surface of lower disc portion 137.

In operation, friction pad 176 is normally biased against the surface of lower disc portion 137 by bias spring 174. When brake solenoid 50 is pulled by an appropriate signal, arm 170 pivots and retracts friction pad 176. When brake solenoid 50 is deactuated, bias spring 174 returns friction pad 176 to its normal rest position against cylindrical portion 137. Pressure roller 167 is normally held away from the surface of member 120 and portion 137 by return bias spring 168. When scan solenoid 47 is energized by an appropriate signal, bracket 162 pivots counter-clockwise as shown, moving pressure roller 167 into surface contact with member 120 and portion 137. When scan solenoid 47 is deenergized, return spring 168 moves pressure roller 167 into the normal rest position.

The frictional force provided by friction pad 176 on the surface of lower cylindrical portion 137 is sufficient to prevent rotation of take-up reel 18 so long as friction pad 176 is so engaged. The frictional coupling between pressure roller 167 and the surface of member 120 and portion 137 is sufficient to provide a one-to-one coupling between these two elements.

The cooperation of the various above-described elements for driving the message supply and take-up reels and the message tape is as follows. With reference to FIGS. 1 and 6–11, when motor 38 is operating, lower cylindrical member is rotated in a forward tape direction by central flywheel 40 and O-ring drive belt 43. Friction pad 176 on brake arm 170, however, pulls take-up reel 18 stationary. To move message tape 19 in a forward direction and record on or reproduce from this tape, FWD M solenoid 32 and brake solenoid 50 are pulled by appropriate signals. When energized, brake solenoid 50 releases friction pad 176, permitting rotation of take-up reel 18 by cylindrical member 120 through friction washer 119. Energization of FWD M solenoid 32 engages message tape 19 with rotating capstan 26 and pressure roller 34, and tape 19 is pulled from supply cartridge 16. As tape 19 is unreeled from supply cartridge 16, friction pad 129 of tape tensioning assembly 55 provides a drag on motion damping member 54 which tends to oppose unreeling of tape 19 and tautens tape 19 across the face of message head 27. As the quantity of tape 19 wound about the hub of take-up reel 18 increases and the moment arm provided by the thickness of the wound tape increases correspondingly, the tendency of this moment arm to pull tape 19 from capstan 26 at an increased linear speed is overcome by the friction coupling between lower cylindrical member 120, friction washer 119 and lower disc portion 137, and elements 120 and 137 begin to slip. The forward motion provided by this friction coupling is just sufficient to continue to wind tape 19 about the hub of take-up reel 18.

When FWD M solenoid 32 and brake solenoid 50 are deenergized, friction pad 176 quickly engages the surface of lower disc portion 137, stopping forward rotation of take-up 18. The back tension provided by tension assembly 55 holds tape 19 taut during braking of take-up reel 18 so that tape 19 comes to rest without any slack.

To move message tape 19 in a reverse direction, rewind solenoid 52 is pulled, arm 150 pivots and grooves pulley 153 engages O-ring drive belt 39 with the outer surface of peripheral flange 150 of motion damping member 54, thereby rotating supply reel assembly 100 in a reverse tape direction and rewinding tape 19. During rewind, brake solenoid 50 is also pulled, retracting friction pad 176 and supply reel assembly 100 is thus rewound against the continued forward pull provided by lower cylindrical member 120 and friction washer 119 on take-up reel assembly 101; thus, when rewind solenoid 52 is deenergized, tape 19 comes to rest without any slack.

To move message tape 19 in a forward direction at a fast forward speed, scan solenoid 47 is pulled and rotates pressure roller 167 into surface contact with cylindrical member 120 and lower disc portion 137, thereby directly coupling these latter elements together and rotating take-up reel 18 in the forward tape direction. When scan solenoid 47 is deenergized, pressure roller 167 is retracted. Brake solenoid is also deenergized, thus stopping rotation of take-up reel 18, and friction pad 129 of tape tensioning assembly 55 provides back tension so that tape 19 comes to rest without any slack in a similar manner to that already described above with reference to forward tape motion during record or reproduce.

Figure 12:
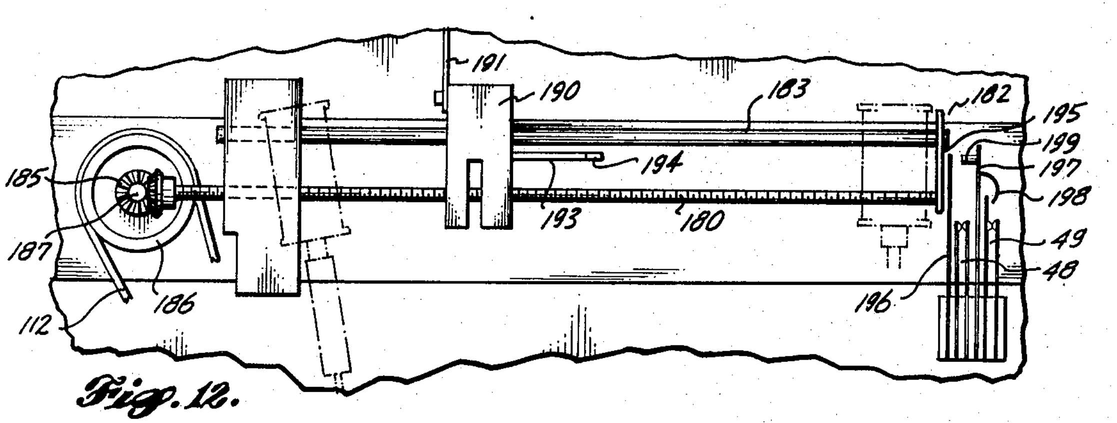
FIG. 12 is a detail view illustrating the length of message indicator.
Figure 13:
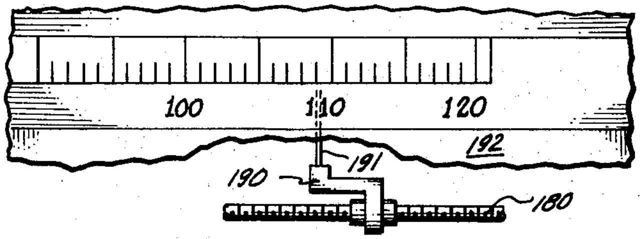
FIG. 13 is another detail view illustrating the length of message indicator.

FIGS. 12 and 13 illustrate length of message indicator assembly 56 which is partially visible in FIG. 2. A screw shaft 180 is journaled for rotation at opposite ends in a pair of mounting brackets 181, 182. A guide rod 183 is also mounted on brackets 181, 182 in parallel, spaced relation to screw shaft 180. A beveled gear 184 is secured to the left end of screw shaft 180 in driven engagement with a central gear portion 185 of driving pulley 186. Driving pulley 186 is mounted on a fixed post 187 for free rotation thereabout. O-ring drive belt 112, driven by cylindrical member 111 of supply reel assembly 100 (FIG. 7), is reeved about a circumferential groove provided about the outer surface of driving pulley 186.

A pointer carriage 190 is slidably disposed on guide rod 182 and mounted for driven translatory motion on screw shaft 180. As best shown in FIG. 13, which is a partial front view of the preferred embodiment, pointer carriage 190 is provided with an unstanding pointer 191 positioned behind a transparent window 192. Window 192 is provided with an appropriate scale indicating the length of message tape 19, in minutes, which has been unreeled from message supply reel 11.

In operation, whenever supply reel 11 is rotated in either the forward or reverse direction, this motion is transmitted to screw shaft 180 via O-ring drive belt 112, driving pulley 186, gear portion 185, and beveled gear 184. Rotation of screw shaft 180 causes a corresponding translatory motion of pointer carriage 190.

Pointer carriage 190 is provided with a laterally extending rod 193 having an electrically insulated tip 194. Tip 194 and rod 193 are sized to permit passage through an aperture 195 in mounting bracket 182 for the following purpose.

A switch assembly 196 having a pair of normally open transfer contacts 48 and a pair of normally closed message deck forward limit switch contacts 49, is located to the right of mounting bracket 182. Transfer switch 48 provides a transfer signal for coupling a second telephone answering device similar to the preferred embodiment disclosed herein to the incalling line whenever the message tape 19 is nearly filled. Message deck forward limit switch 49 deenergizes FWD M solenoid 32 whenever the message tape 19 is nearly filled, but a sufficient time after the transfer switch has generated the transfer signal to enable the second telephone answering device to be placed in the ready state.

A first switch actuator blade 196 is positioned between contacts 48 and aperture 195. A second switch actuator blade 197 is positioned between contacts 48 and contacts 49 and has a snap spring 198 which is connected to one of the contacts 49. An electrical insulator tip is attached to the end of second actuator blade 197 extending in the direction of first actuator blade 196.

In operation, when message tape 19 is nearly completely unreeled, insulated tip 194 of pointer carriage 190 emerges from aperture 195 and bends first actuator blade 196. When blade 196 has been bent a prescribed amount, transfer switch contacts 48 close. As tip 194 emerges further from aperture 195, blade 196 continues to bend and finally makes contact with insulator tip 199, whereupon second actuator blade 197 begins to bend. After blade 197 has been bent a prescribed amount, snap spring 198 forces the left contact of pair 199 to the left, opening contacts 49 of message deck forward limit switch. When pointer carriage tip 194 is retracted through aperture 195, contact pairs 48 and 49 return to the configuration shown.

All of the rotating reels and pulleys disclosed above may be easily and inexpensively constructed from any lightweight moldable plastic material, such as Delrin. The O-ring drive ring belts may be constructed of ethylene-propylene, neoprene, or silicon rubber. The friction washers may comprise a suitable friction material, such as Sae F-1 felt. The various spindles may be constructed of stainless steel. Other equivalent materials will occur to those skiled in the art. Recording heads 27, 28 preferably each comprise a hyperbolic ground magnetic record/erase head.

The preferred embodiment of the invention has six modes of operation which will now be described in conjunction with FIGS. 14–22. These six modes of operation are as follows.

In dictate mode (FIG. 17) the handset transmitter is coupled through an automatic volume control circuit (hereinafter designated AVC circuit, 225 and an amplifier 220 to message head 27 so that ordinary office dictation messages may be recorded on message tape 19.

In playback mode (FIG. 18) messages dictated on tape 19 are coupled from message head 27 through amplifier 220 and a hook switch 248, described below, to the handset receiver and through a speaker amplifier 249 to a speaker 250 so that the message may be monitored.

In announcement/record mode (FIG. 19), the handset transmitter is coupled through AVC circuit 225 and amplifier 220 to announcement head 89 and through a syllabic detector 270 to an announcement timer 251 having a six second time-out, both described below, so that a proper announcement may be recorded on announcement tape 69.

In announcement check mode, (FIG. 20) an announcement on tape 69 is coupled from announce head 89 through amplifier 220 and hook switch 248 to the handset receiver and through speaker amplifier 249 to speaker 250 so that the content and fidelity of the announcement may be checked, and also through syllabic detector 270 to announcement timer 251 having a three second time-out period so that the operation of timer 251 may be checked.

In automatic answer announce mode (FIG. 21) an announcement on tape 69 is coupled from announcement head 89 through amplifier 220 to a standard telephone coupler, or directly to a telephone line, (and hence to the caller) and through syllabic detector 270 to announcement timer 251 so that a recorded announcement may be reproduced in response to an incoming call and the telephone answering device switched over to automatic answer record mode by announcement timer 251.

In automatic answer/record mode (FIG. 22) a message received from a calling party is coupled through the telephone coupler, or directly to a telephone line, AVC circuit 225 and amplifier 220 to message head 27 so that the message may be recorded through hook switch 248 to the handset and also through speaker amplifier 249 to speaker 250 so that the message may be monitored, and through syllabic detector 270 to message timer 260 having a twelve second time-out period, so that the telephone answering device may be readied for another message after the termination of the message being received.

Figure 16:
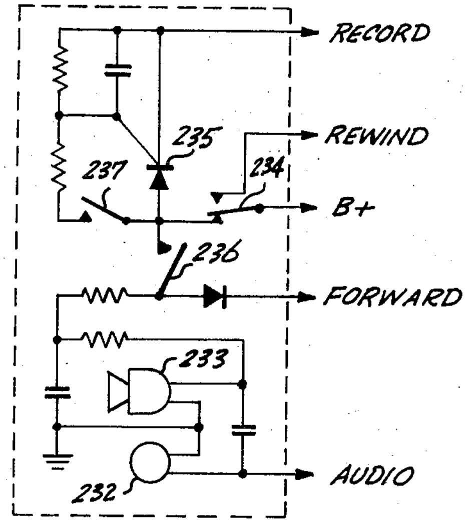
FIG. 16 is a schematic diagram of the handset portion of the FIG. 1 embodiment.
Figure 14:
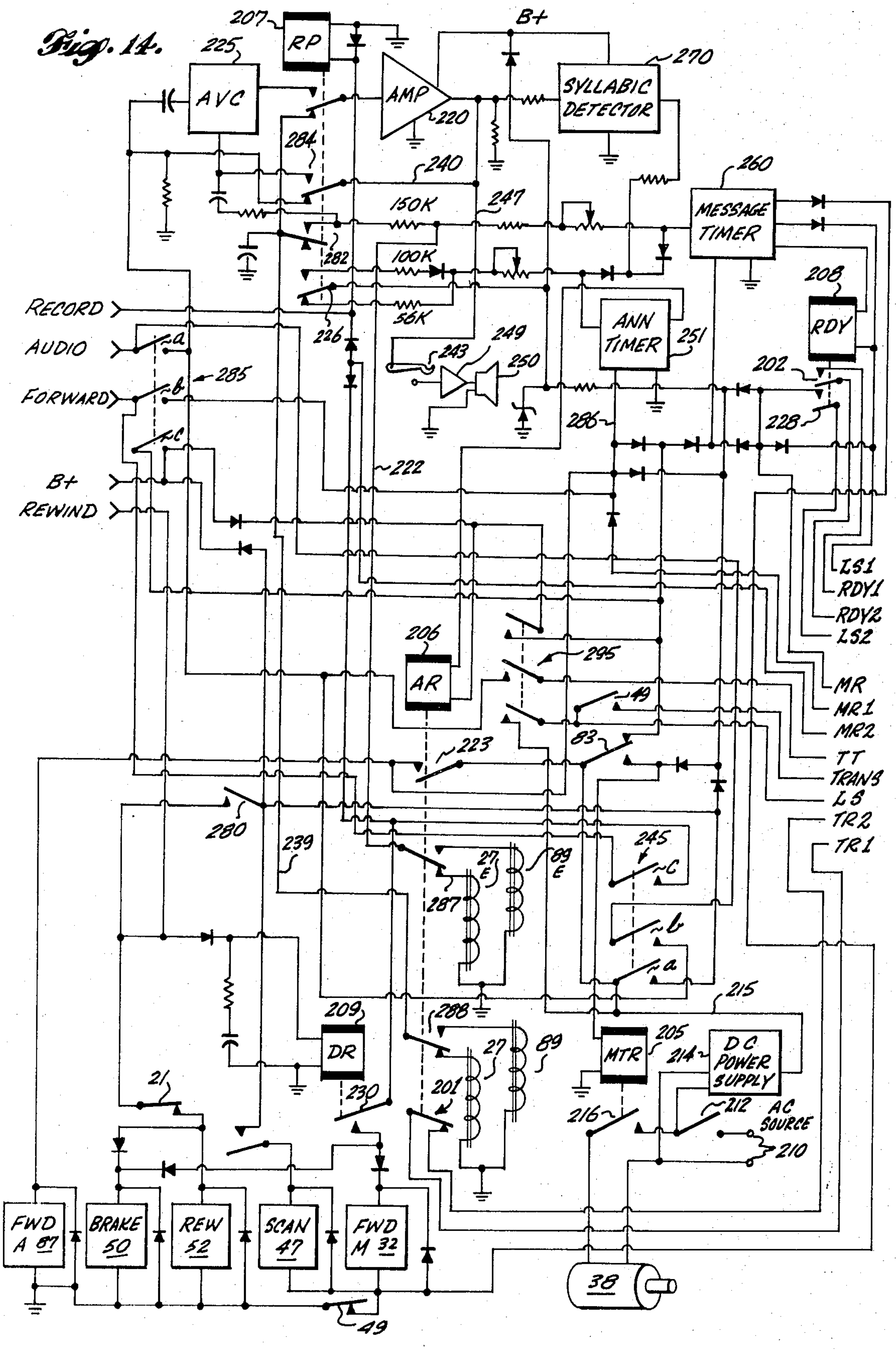
FIG. 14 is a schematic diagram of the electromechanical circuitry of the FIG. 1 embodiment.
Figure 17:
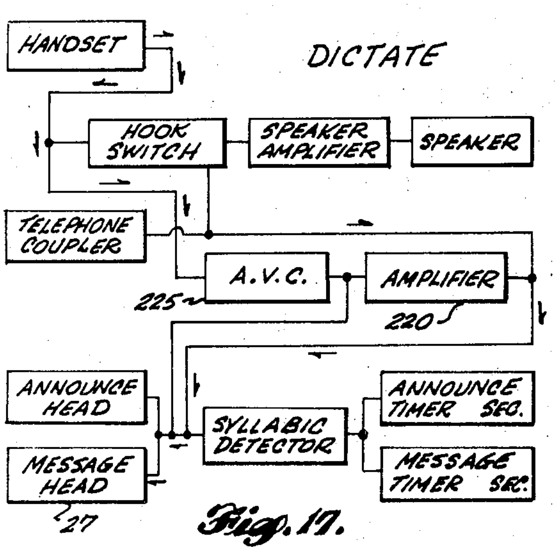
FIGS. 17–22 are block diagrams illustrating the various modes of operation of the invention.
Figure 18:
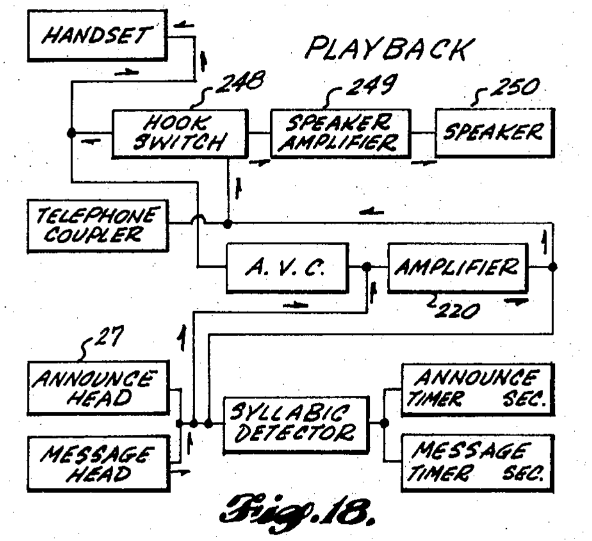
Figure 19:
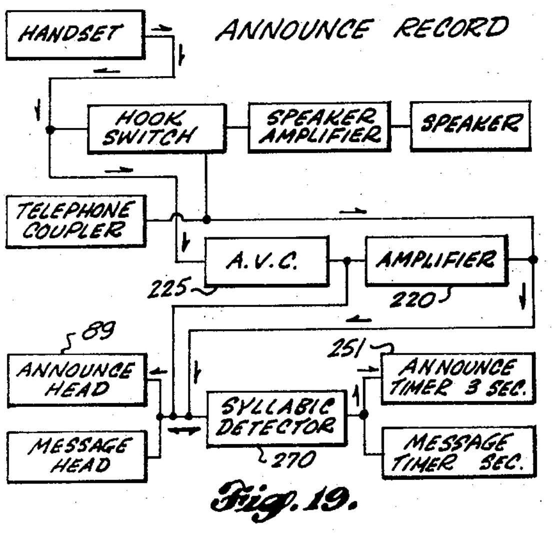
Figure 20:
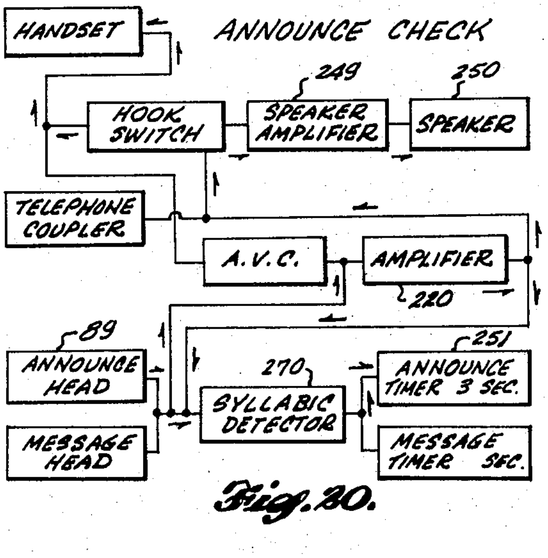
Figure 21:
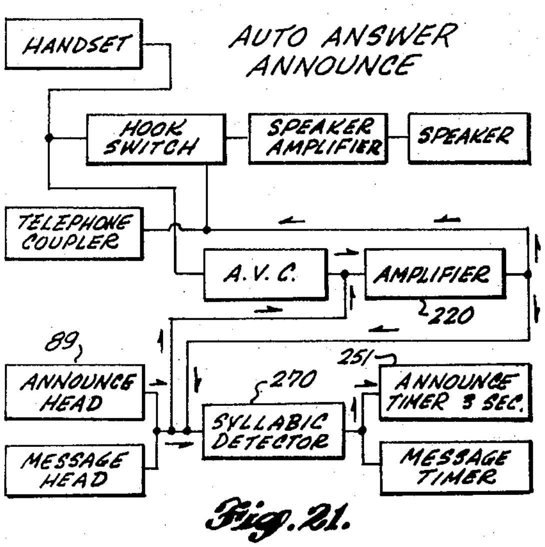
Figure 22:
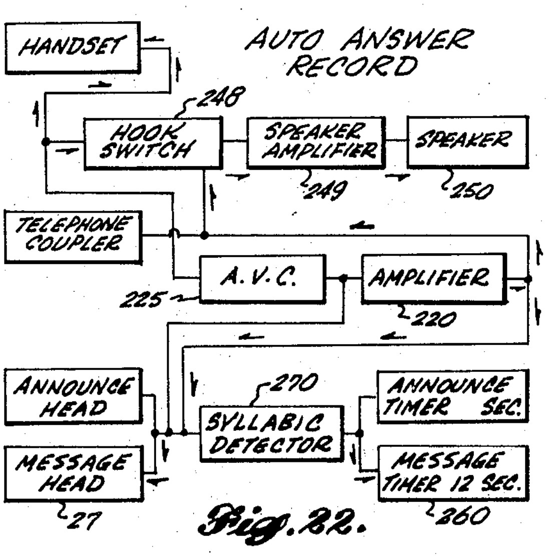

FIG. 14 is a circuit diagram of the electromechanical circuitry of the preferred embodiment excluding that portion located in the telephone handset, which is shown in FIG. 16. As will be evident to those skilled in the art, the lettered connectors located at the extreme right center of FIG. 14 are adapted to be directly connected to a standard bell coupler customarily used to connect so-called foreign devices to a telephone line, which forms no part of the invention, and which is thus not disclosed herein for the sake of conciseness. Briefly, the standard Bell coupler has internal circuitry for performing the following switching functions. If power is present at LS terminal the Bell coupler initially connects LS to LS1. In response to an incoming call, the coupler switches LS from LS1 to LS2, LS2 to MR, MR to MR1, and the calling line to TT. If a pulse signal is thereafter provided to the coupler, as by closing a pair of contacts 201 and connecting terminal TR1 and TR2, the coupler switches MR from MR1 to MR2. If a second pulse signal is thereafter provided to the coupler, as by opening a pair of contacts 202, the coupler switches LS from LS2 to LS1, and MR from MR2 to MR1. The circuit elements of FIG. 14 include five relays: motor relay 205, announcement relay 206, record/playback relay 207, ready relay 208, and delay relay 209, all having associated contacts as shown, the broken lines indicating mechanical interconnections. A.C. power is supplied to input terminals 210. When power switch 212 is closed, D.C. power supply 214, which may be a filtered full-way rectifier circuit, provides D.C. voltage of a suitable potential on lead 215.

Motor relay 205 controls operation of motor 38. When main power switch 212 is closed, and motor relay 205 is actuated, contacts 216 close connecting motor 38 to A.C. terminals 210 and energizing the motor.

Announcement relay 206 controls the switching configuration of announcement/record and erase sections 89R, 89E of announcement recording head 89, and message record and erase sections 27R, 27E of message record/erase head 27, the latter sections being ordinarily connected to the input of an amplifier 220 and to D.C. erase bias lead 222, respectively. Announcement relay 206 also controls contacts 201 used to provide the switching signal to coupler terminals TR1, TR2, as well as FWD A solenoid 87 via contacts 223.

Record playback relay 207 controls the input to amplifier 220, AVC circuit 225, both of a known design, as well as the potential on D.C. erase bias lead 222, the latter via contact 226. Ready relay 208, used exclusively during automatic answer announcement and automatic answer record modes of operation furnishes D.C. power to several circuit elements via contact 228, as well as a switching signal to coupler terminals RDY1, RDY2.

Delay relay 209 is used to block actuation of FWD M solenoid 32 via contact 230 while message tape 19 is coasting to a stop in the rewind direction in the manner discussed above. This is a precautionary measure designed to preclude any possibility of rupturing tape 19 by actuating the forward drive mechanism while tape 19 is still moving in the reverse direction.

Although all machine functions may be initiated by means of switches mounted on the main machine casing, it has been found desirable to provide for the initiation of certain control functions from the handset portion of the device. The circuit elements housed for this purpose in the handset are shown in FIG. 16.

Handset receiver 232 and transmitter 233 are each coupled to an Audio terminal. B+ is coupled through a single pole double throw switch 234 to the junction of the anode of a silicon control rectifier 235 and two normally open single pole single throw switches 236, 237. Thus, by closing switch 236 B+ is connected to the FORWARD terminal and also to transmitter 233; while by closing switch 237 silicon control rectifier 235 is fired, thereby providing B+ to the RECORD terminal. If switch 234 is thrown to the opposite configuration, B+ is supplied to the REWIND terminal and removed from the remaining terminal. All the labeled terminals shown in FIG. 16 are directly coupled to their corresponding terminals shown in FIG. 14.

Amplifier 220 provides amplification for outgoing announcements, incoming messages, and dictaphone type messages in both the record and reproduce modes. For example, with announcement relay 206 and record/playback relay 207 contacts in the configuration shown, message record head 27R is coupled via input lead 239 through amplifier 220, and via leads 240, 241 to one side of portion 245A of a normally open switch assembly 245. When this switch assembly is closed during the dictate and playback modes of operation, so that the message tape is driven in the forward direction, a dictaphone type message recorded on tape 19 is coupled through amplifier 220 to handset receiver 232.

An alternate audio output source for monitoring recorded announcements and messages is provided by lead 247, hook switch 248, speaker amplifier 249 and speaker 250. Hook switch 248 is normally mechanically biased to the open configuration shown, so that speaker amplifier 249 is disconnected whenever the handset is lifted from the cradle. When the handset is replaced on the cradle, hook switch 248 is closed and speaker amplifier 249 is connected to the output of amplifier 220.

Figure 15:
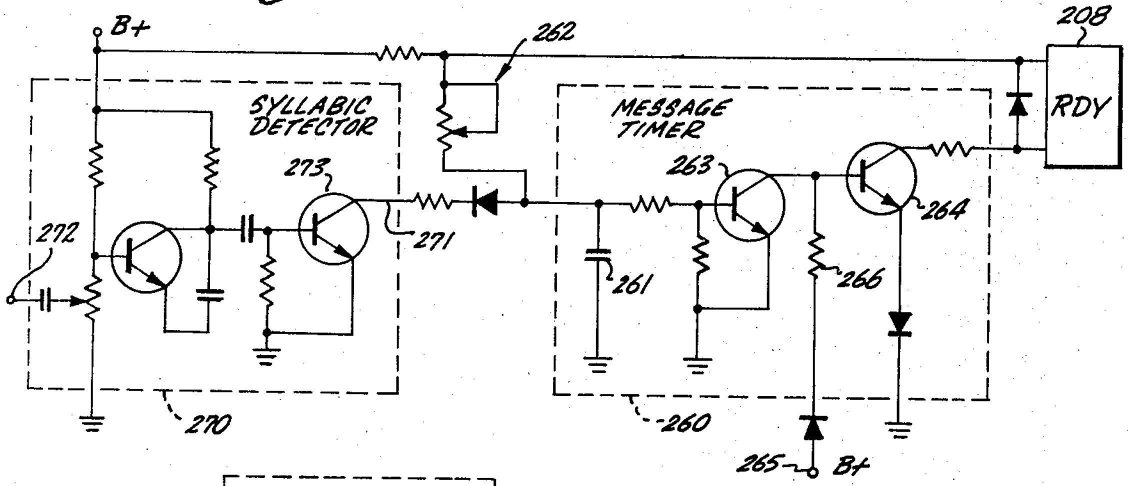
FIG. 15 is a schematic diagram illustrating the syllabic detector and message timer of FIG. 14.

An important feature of the invention resides in the operation of announcement timer 251, message timer 260, and syllabic detector 270, the latter two circuits being shown in detail in FIG. 15. Syllabic detector 270 comprises a circuit for providing a low impedance to terminal 271 whenever human speech signals are present at input terminal 272. Basically, this circuit examines the modulation envelope of the input signal and passes only those envelope signals falling in the range of from 0 to about 10 cycles per second. If such signals are present, which is a known accurate condition for identifying the human speech signals, transistor 273 is turned on during the down slope portions of the signal pass. So long as transistor 273 is conducting, a low impedance path is provided from terminal 271 to ground.

Message timer 260 which is utilized to deactuate ready relay 208, includes a charging capacitor 261 which is charged from B+ via potentiometer 262 and coupled to the base of normally off transistor 263. For the sake of simplicity, ready relay 208 is shown directly coupled to B+, while in actuality this connection is made through the coupler via terminal LS1 and S circuit of FIG. 14.

A path through ready relay 208 to ground from B+ is provided by a transistor 264 which is initially turned on by B+ potential at terminal 265 coupled through resistor 266 to the base of this transistor. If transistor 264 is turned off, this path is interrupted and ready relay 208 is deactuated.

In operation, transistor 264 is initially turned on and capacitor 261 begins to charge. If human speech signals are applied to terminal 272 of syllabic detector 270, capacitor 261 is discharged via transistor 273. When human speech signals cease to be so applied—e.g., after a message is completed—capacitors 261 charge up uninterruptedly until the threshold potential required to turn on transistor 263 is reached. When transistor 263 turns on, the base of transistor 264 is coupled to ground potential, turning this transistor off and deactuating ready relay 208.

The actual time period between the cessation of the human speech signals and the deactuation of ready relay 208 is a function of the time constant the charging circuit including capacitor 261. This may be varied by adjusting potentiometer 262. In actual practice, a time period of about twelve seconds has been found to provide excellent results for message timer 260.

As shown in FIG. 14, announcement timer 251, which is used to control the deactuation of announcement relay 206 is also coupled to syllabic detector 270. The structure and operation of announcement timer 251 is substantially identical with that already described for message timer 260 with the following exceptions. In announcement check and automatic answer/announce modes, when a recorded announcement is being reproduced the charging current is supplied via record/playback relay contacts 226 and a first resistor, shown as having a value of 56 K ohms, in order to provide a first timing period of about three seconds. However, in announcement record mode, charging current is supplied via record/playback relay contacts 226 and a second greater value resistor, shown as having a value of 100 K ohms, in order to provide a second timing period of about six seconds. This longer period is provided to ensure that a sufficient portion of any previously recorded longer announcement on announcement tape 69 will be erased to prevent false operation during automatic answer/announce mode.

This may be best illustrated by assuming a previously recorded announcement of seventeen seconds duration on announcement tape 69. Assume now that a new announcement of thirteen seconds duration is recorded on tape 69. During automatic answer/announce, the new announcement is reproduced. If the timer period is one second longer during automatic answer/announce than it was during recording of the new announcement, which in practice can result from line voltage fluctuations or circuit parameter changes, the unerased portion of the old announcement will be reproduced before the period has lapsed. Absent the circuitry providing the longer second timing period during announcement/record, the erase portion of the old announcement will then be reproduced to the caller. To eliminate this possibility, the longer second timing period is provided, which guarantees a pause after the new announcement much greater than the maximum expected variation due to voltage fluctuations or variations in circuit parameters.

The detailed operation of the preferred embodiment during the various modes of operation will now be described. Dictate and playback modes are both enabled by closing ganged switch assembly 245, coupling B+ to the B+ handset terminal, syllabic detector 270 and amplifier 220 via contacts **245*a* of switch 245, coupling the message record head 27 to the handset receiver via contacts 245*b*, and coupling the FORWARD handset switch terminal to FWD M solenoid 32 via contacts 245*c*. If handset FORWARD switch 236 (FIG. 16) is now closed to initiate playback mode, FWD M solenoid 32 is energized along with brake solenoid 50 and message tape 19 proceeds in the forward direction. Since no erase bias potential is present on erase bias lead 222,** the messages are reproduced without being erased.

During dictate and playback modes, message tape 19 may be rewound by opening handset FORWARD switch 236 and closing either handset REWIND 234 or alternate REWIND switch 280, thereby energizing brake solenoid 50 and rewind solenoid 52. If the tape is fully rewound, rewind limit switch 21 opens, deenergizing brake and rewind solenoids 50, 52.

To initiate record mode, handset RECORD switch 237 is momentarily closed, which actuates record/-playback relay 207. Actuation of this relay provides B+ potential on D.C. bias lead 239 via relay contacts 282; and couples the handset transmitter via switch contacts **245*b*, AVC circuit 225, amplifier 220, and relay contacts 282 to message/record head 27R. If the handset FORWARD switch 236 is now closed, the message may be recorded on the now moving tape 19, erase bias being provided by the potential on erase bias lead 222. Other control functions proceed as outlined above. To reinitiate playback mode, handset REWIND switch 234 may be closed, thereby removing the holding current for record/playback relay 207.**

To enable operation of announcement record and announcement check modes, ganged switch assembly 285 is closed, coupling handset AUDIO to the record/-playback relay 207 contacts via contacts **285*a*, coupling handset FORWARD terminal to announcement timer 251 and FWD A solenoid 87 via contacts 285*b* and coupling B+ to announcement relay 206 via contacts 285*c*. Since announcement timer 251 is not conditioned on terminal 286, announcement relay 206** is not actuated at this time.

Announcement record mode may now be initiated by closing handset RECORD switch 237, with the same results as described above, and handset FORWARD switch 236, which conditions announcement timer 251 to provide a conductive path for announcement relay 206, thereby actuating this relay. Closing of announcement relay 206, contacts 223, energizes FWD A solenoid 87, and announcement tape 69 moves forward. Closing of announcement relay contacts 287, 288 connects the output of amplifier 220 to announcement record and erase sections 89R, 89E. An announcement may now be recorded. It is again noted that, during announcement record mode, announcement timer 251 is charged through the 100 K ohm resistor, providing the longer time-out period. Six seconds after the termination of the announcement, announcement timer 251 deactuates announcement relay 206, deenergizing FWD A solenoid 87 and disconnecting the announce head 89 from amplifier 220. As disclosed above, announcement tape 69 rewinds automatically.

To initiate announcement check mode, handset FORWARD switch 236 is again closed, conditioning announcement timer 251 and energizing FWD A solenoid 87. Announcement relay 206 is actuated as before and announcement head 89 is coupled via contacts 288 to the input of amp 220, and from the output thereof to the handset AUDIO terminal. If the announcement has been properly recorded, announcement timer 251 will again deactuate announcement relay 206 after the termination of the announcement. It is noted that, during announcement check mode announcement timer 251 is charged to the 56 K ohm resistor, providing the shorter time-out period of approximately three seconds.

Automatic answer announcement and record modes are enabled by closing ganged switch assembly 295. Closing of contacts 295*a* connects B+ to announcement relay 206. Closing of contacts 295*b* connects coupler terminal TT to record playback relay 207 contacts. Closing of contacts 295*c* connects B+ to coupler terminal LS, which it will be remembered as connected by the coupler to LS1, thence to ready relay 208. Automatic answer announce mode is initiated by an incoming call. In response to such a call, the coupler switches LS from LS1 to LS2 which conditions announcement timer 251, thereby actuating announcement relay 206. Actuation of announcement 206 connects announcement head 89 to the input of amplifier 220, and thence to the TT coupler terminals via contacts 295*b*, and also energizes FWD A solenoid 87 causing announcement tape 69 to move in the forward direction.

Transfer of LS to LS2 also provides B+ and MR1 and thence to motor relay 205 actuating this relay and starting the motor. B+ is also provided via MR1 to condition message timer 260 which causes actuation of ready relay 208.

With the motor running, the announcement tape moving in the forward direction and the announcement heads 89 coupled to coupler terminal TT, the recorded announcement is reproduced over the telephone line to the caller. Approximately three seconds after the termination of the announcement, an announcement timer 251 deactuates announcement relay 206, thereby initiating automatic answer record mode.

Deactuation of announcement relay 206 closes contacts 201 which provides a transfer signal to the coupler via terminals TR1, TR2. Upon receipt of this signal, the coupler switch MR from MR1 to MR2. Disconnection of MR1 removes B+ from announcement timer 251 conditioning lead 286 and from announcement relay 206, thereby preventing reactuation of this relay. Connection of MR to MR2 causes record playback relay 207 to be actuated, which connects TT coupler terminal (and thus the caller) to message record head 27R via AVC circuit 225 and amplifier 220, and also energizes FWD M 32 in brake 50 solenoids, which inaugurates forward movement of message tape 19 across record head 27, after which the caller's message may be recorded. Approximately twelve seconds after the end of the message, message timer 260 deactuates ready relay 208, thereby closing ready relay contacts 202 which provides a second transfer signal for the coupler. Upon receipt of this signal, the coupler switches LS from LS2 to LS1 and MR from MR2 to MR1. The apparatus is now in the enable state for initiation of another automatic answer announcement-record cycle.

If message deck transfer switch 49 is closed by the pointer carriage during the recording of the message when the device is in the automatic answer record mode, a third transfer signal is generated, and the coupler connects a second telephone answering device to the calling line before forward message limit switch 49 halts the forward progress of tape 19.

While a particular embodiment of the invention has been shown and described, various modifications thereof will be apparent to those skilled in the art and it is therefore not intended that the invention be limited to the disclosed embodiment or details thereof. Further, departures may be made therefrom within the spirit and scope of the invention as defined in the claims.

It is claimed and desired to secure by Letters Patent:

1. In a tape reproducing apparatus having a tape supply reel and a tape take-up reel, a power driven means for driving said supply and take-up reels in the forward and reverse tape directions, said last-named means comprising a flywheel, means including a first drive belt reeved about a first portion of said flywheel for rotating said flywheel in a single direction, a yieldable forward coupling means including a rotatable cylindrical member and a friction clutch for rotatively coupling said flywheel to said take-up reel to rotate said take-up reel in said forward tape direction, a second drive belt reeved about a second portion of said flywheel and a portion of said forward coupling means, a normally engaged take-up reel braking means for applying a braking force to said take-up reel, means for disengaging said braking means, a normally disengaged reverse coupling means for rotating said supply reel in said reverse tape direction with a force sufficient to overcome said yieldable forward coupling means, means for engaging said reverse coupling means with said first drive belt, a fast forward assembly comprising a rotatable pressure roller engageable with a portion of the surface of both said cylindrical member and said take-up reel, and actuating means for engaging said pressure roller with said surface portions.

2. In a tape reproducing apparatus having first and second tape decks, each set of tape decks including a supply reel and a take-up reel, a power driven means for individually driving each of said supply and take-up reels of said decks in both the forward and reverse tape directions, said power driving means comprising a flywheel, means including a first drive belt reeved about a first portion of said flywheel for rotating said flywheel in a single direction, a first yieldable coupling means for rotatively coupling said flywheel to said first take-up reel to rotate said first take-up reel in said forward tape direction, a second drive belt reeved about a second portion of said flywheel and a portion of said first yieldable coupling means, a normally engaged braking means for applying a braking force to said first take-up reel, means for disengaging said braking means, a normally disengaged reverse tape coupling means for rotating said first supply reel in said reverse tape direction with a force sufficient to overcome said first yieldable coupling means, means for engaging said reverse coupling means with said first drive belt, a second yieldable coupling means for rotatively coupling said flywheel to said second supply reel for rotating said second reel in said reverse tape direction, a third drive belt reeved about a third portion of said flywheel and a portion of said second yieldable coupling means, a normally disengaged forward coupling means for rotating said second take-up reel in said forward tape direction with a force sufficient to overcome said second yieldable coupling means, and means for engaging said forward coupling means with said flywheel, said second yieldable coupling means providing bias tension for said tape when said forward coupling means is engaged with said flywheel.

3. The apparatus of claim 2 wherein said portion of said first and second yieldable coupling means each comprises a rotatable cylindrical member, and said first and second yieldable coupling means each includes a friction clutch for coupling motion of said cylindrical member to the reel associated thereto.

4. The apparatus of claim 3 wherein said cylindrical member of each of said first and second yieldable coupling means and the reel associated thereto, said first supply reel, and said second take-up reel are each rotatably disposed on a separate fixed spindle.

* * * * *